United States Patent Office 3,146,264
Patented Aug. 25, 1964

3,146,264
NITRILES OF THE TETRACYCLINES
Raymond G. Wilkinson, Pearl River, N.Y., and James H. Boothe, Montvale, N.J., assignors to American Cyanamid Company, New York, N.Y., a corporation of Maine
No Drawing. Filed Feb. 14, 1955, Ser. No. 488,122
4 Claims. (Cl. 260—559)

This invention relates to new organic compounds and methods for their preparation. More particularly, this invention is concerned with the nitriles of tetracycline, chlortetracycline and bromtetracycline.

In the copending application of Joseph Petisi and James H. Boothe, Serial No. 488,164, filed February 14, 1955, now abandoned, there are described a series of tertiary-butyl derivatives of tetracycline and its halogen analogs—namely, chlortetracycline and bromtetracycline. The respective bases from which the tertiary butyl derivatives are obtained are well-known antibiotics possessing recognized therapeutic properties. The compounds have been adequately described in various patent applications and technical publications both in this country and abroad. They will hereafter be collectively referred to as the "tetracyclines."

The tertiary-butyl derivatives of the tetracyclines are prepared by reacting the nitrile of the appropriate tetracycline with isobutylene in the presence of a strong mineral acid such as sulfuric acid. Alternatively, if desired, the acid medium may be a mixture comprising a lower aliphatic acid such as formic, acetic, propionic or butyric acid, and sulfuric acid.

When the nitriles of the tetracyclines are treated with isobutylene and a mineral acid such as sulfuric acid, there occurs a simultaneous alkylation of the acid amido group in the 2-position and a dehydration of the hydroxy group in the 6-position. The net result of the alkylation reaction is the formation of the tertiary butyl derivatives of the corresponding anhydrotetracyclines.

The tertiary butyl derivatives of the anhydrotetracyclines exhibit considerable antimicrobial activity against organisms of the Gram-positive and Gram-negative class. When tested in accordance with the well-known agardilution technique, the following pathogenic bacteria are inhibited in concentrations varying from 0.001 to 1.0 mg. per ml.: *Bacillus subtilis, Proteus vulgaris, Escherichia coli*, β-hemolytic Streptococcus, *Pseudomonas aeruginosa* and others.

The novel compounds of the present invention are the nitriles of tetracyclines. They may be represented by the following general formula:

R—CN wherein R is a member selected from the group consisting of tetracyclino, chlortetracyclino, and bromtetracyclino radicals, attached to the CN group by a single bond, carbon to carbon linkage at the 2-position. As indicated above, the new compounds are useful as intermediates in the preparation of tertiary-butyl derivatives of the anhydrotetracyclines which possess broad antimicrobial activity. These compounds and their preparation are described in detail in the above-mentioned application of Petisi and Boothe.

A preferred method for preparing our novel compounds is to treat the corresponding tetracycline base with a suitable dehydrating agent. We prefer an alkyl sulfonyl halide such as methane sulfonyl chloride for this purpose, although other known dehydrating reagents are also capable of accomplishing the same function. As examples may be given benzenesulfonyl chloride, p-toluenesulfonyl chloride, thionyl chloride, phosphorus oxychloride, sulfuric acid and the like.

The dehydration reaction being exothermic is most advantageously conducted at low temperatures in the order of $-10°$ C. to $5°$ C., preferably from about $-5°$ C to about $0°$ C. A further preference is to conduct the reaction in the presence of a tertiary amine base such as pyridine, trimethylamine, tripropylamine and triisobutylamine. The base is not only employed to impart basicity to the reaction mixture, but to also serve as an acid acceptor for the hydrogen chloride liberated during the course of the reaction.

A particular modification which is intended to be included within the scope of the present invention is an alternative method for preparing the nitrile of tetracycline by reduction of chlortetracyclinonitrile. The reduction may be suitably carried out by hydrogenation in the presence of palladium-charcoal catalyst. A preferred method for accomplishing the reduction is to slurry the chlortetracyclinonitrile with an inert organic solvent such as methyl Cellosolve. It is preferred also to employ a quantity of a suitable tertiary amine base such as triethylamine or pyridine in about twice the molar ratio of chlortetracyclinonitrile to alkalinize the reaction mixture. The reaction mixture is then subjected to hydrogenation in the presence of the catalyst until the up-take of hydrogen ceases. The catalyst is then filtered off and ethanolic hydrochloric acid is added until the pH drops to about 3.0 to 3.5 at which time a crystalline solid separates which is tetracyclinonitrile.

It is to be understood that the dehydration process of the present invention is applicable not only to the preparation of tetracyclinonitrile from tetracycline but also to the formation of halogen analogs of tetracyclinonitrile from the corresponding bases. Further, the reduction of chlortetracyclinonitrile to tetracyclinonitrile is equally satisfactory with bromtetracyclinonitrile starting material.

The following examples are intended to illustrate but not to limit the scope of the present invention. All parts are by weight unless otherwise indicated.

*Example I*

5 parts by weight of tetracycline base was dissolved in 20 parts by volume of pyridine, cooled to below $0°$ C. and 4 parts by volume of methane sulfonyl chloride was dropped in with stirring and the temperature was maintained at below $5°$ C. A precipitate formed during the addition and the mixture was stirred for 1 hour after all had been added and was then poured into 150 parts by volume of ether which precipitated a very gummy material. The ether was poured off and 75 parts by volume of water was added which turned the gummy mass to a yellow solid. The mixture was acidified to about pH 2 and the solid was filtered off and dried. 0.5 part by weight of the crude product was boiled in 50 to 60 parts by volume of acetone and dimethylformamide was added slowly until complete solution resulted. The solution was treated with activated charcoal, filtered and cooled and crystals of tetracyclinonitrile were collected. These were recrystallized by dissolving in 1 part by volume of dimethylformamide and diluting with about 5 to 6 parts by volume of acetone. The product, after drying at $60°$ C. under reduced pressure, was found to contain on elemental analysis, 60.8% carbon, 5.41% hydrogen and 6.24% nitrogen. Based on this analysis we have assigned the formula $C_{22}H_{22}N_2O_7 \cdot \frac{1}{2} H_2O$ to this compound.

*Example II*

4.61 parts by weight of chlortetracyclinonitrile was slurried in 75 parts by volume of methyl Cellosolve and 2.8 parts by volume of triethylamine was added. The mixture was shaken mechanically for 15 to 20 minutes, at which time nearly all of the solids were in solution. The solution was filtered and 0.5 part by weight of 10% palladium-charcoal catalyst was added to the filtrate. The solution was shaken on the hydrogenator at 20° C. and atmosphere pressure. In 25 minutes, 245 parts by volume of hydrogen was taken up and the up-take had nearly stopped. The catalyst was filtered off and 1.3 parts by volume of 7.7 N ethanolic hydrogen chloride was added which brought the pH to 5.0 to 6.0. A few more drops brought the pH to 3.0 to 3.5 and a crystalline solid separated. After cooling in ice, the product was filtered off and washed well by reslurrying with water. The dried product, tetracyclinonitrile, weighed 3.5 grams. On elemental analysis, the product contained 60.3% carbon, 5.8% hydrogen and 6.33% nitrogen.

*Example III*

To 10 parts by weight of chlortetracycline dissolved in 40 parts by volume of pyridine, cooled in an ice-acetone bath, was added dropwise over 10 minutes, 7.9 parts by volume of methanesulfonyl chloride in 10 parts by volume of dimethoxyethane. The solution was swirled during the addition and when about ½ of the reagent had been added, some yellow crystals started to form. The mixture was allowed to stand for 2 hours in the cooling bath and then the mush solid was filtered off from the dark pyridine mother liquor and washed with methylene chloride. The solid was washed twice on a funnel with water which dissolved part of the solid, presumably pyridine hydrochloride. The remaining solid was slurried with water and sufficient dilute hydrochloric acid to bring the pH to about 1.0 without appreciable solution occurring. This was sucked off and on washing the solid with more water, the pH of the wash water returned to about 4.5. The solids were washed with ethanol, with water, with ethanol again and finally with ether. The solids were dried at 60° C. for 1 hour at 0.3 mm. pressure. The yield of yellow crystalline chlortetracyclinonitrile was 53%. The product was recrystallized by dissolving 5 parts by weight in about 100 parts by volume of dimethylformamide at about 90° C. and then cooling the solution. Yellow needles or plates crystallized. These were filtered and washed with acetone. On drying 1 hour at 60° C., a 46% over-all yield of product was obtained. On elemental analysis, the product was found to contain 57.15% carbon, 4.90% hydrogen, 6.24% nitrogen and 7.47% chlorine.

*Example IV*

Following the procedure set forth in Example III, one may convert bromtetracycline to the corresponding nitrile. Bromtetracycline starting material may be obtained by growing a bromtetracycline-producing strain of *Streptomyces aureofaciens* in a bromide ion-containing nutrient medium under submerged aerobic conditions. After bromtetracycline activity is imparted to the medium, the antibiotic may be recovered by suitable means such as precipitation with an alkaline earth metal salt. This antibiotic substance and the method for its preparation are described fully in the U.S. patent application of Albert P. Doerschuk, Barbara A. Bitler and Milton A. Petty, Serial No. 388,604, filed October 27, 1953, now abandoned. The conversion of bromtetracyclinonitrile to tertiary-butyl anhydrobromtetracycline takes place readily under the same conditions described above for chlortetracyclinonitrile.

We claim:
1. A compound selected from the group consisting of 2-decarboxamidotetracyclino-2-nitrile, 2-decarboxamidochlortetracyclino-2-nitrile, and 2-decarboxamidobromtetracyclino-2-nitrile.
2. 2-decarboxamidotetracyclino-2-nitrile.
3. 2-decarboxamidochlortetracyclino-2-nitrile.
4. 2-decarboxamidobromtetracyclino-2-nitrile.

References Cited in the file of this patent
UNITED STATES PATENTS 2,699,054 Conover _____ Jan. 11, 1955
3,028,409 Stephens _____ Apr. 3, 1962

OTHER REFERENCES

Boothe et al.: "J. Am. Chem. So.," vol. 75, September 20, 1953, p. 4621.

Conover et al.: "J. Am. Chem. Soc.," vol. 75, September 20, 1953, pp. 4622 to 4623.

Hochstein et al.: "J. Am. Chem. Soc.," vol. 75, November 28, 1953, pp. 5456, 5468 and 5472.

Stephens et al.: "J. Am. Chem. Soc.," vol. 76, July 5, 1954, pp. 3570, 3573.

Minieri et al.: "Antibiotics Annual," 1953–1954, pp. 83–84.